Aug. 28, 1934.  E. V. J. TOWER  1,971,665
CLUTCH PLATE
Filed Jan. 7, 1932  3 Sheets-Sheet 1

INVENTOR
Elmer V. J. Tower
BY
Pennie, Davis, Marvin & Edmonds
ATTORNEYS

Aug. 28, 1934.       E. V. J. TOWER       1,971,665
CLUTCH PLATE
Filed Jan. 7, 1932       3 Sheets-Sheet 2

INVENTOR
Elmer V. J. Tower
BY
ATTORNEYS

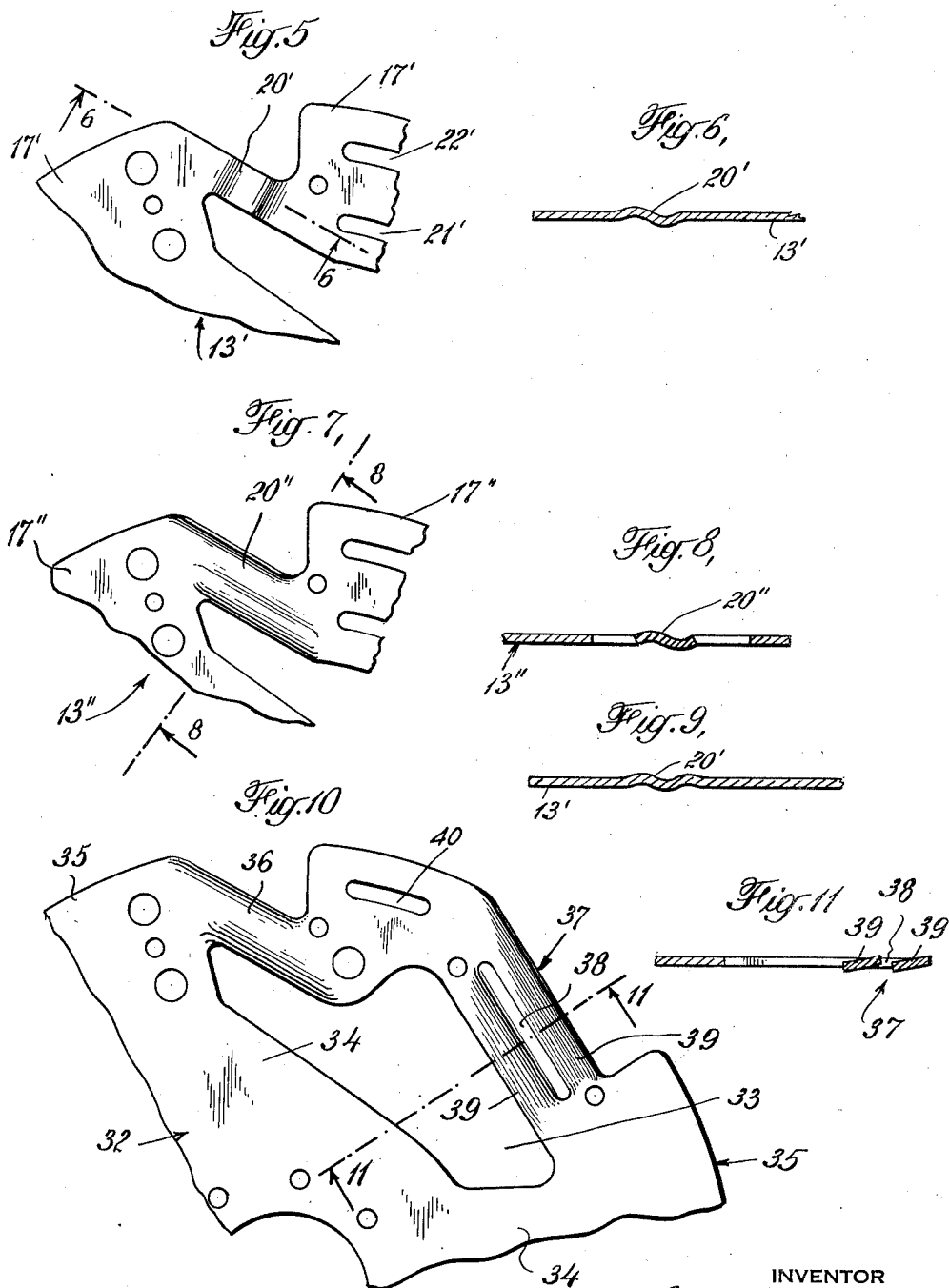

Patented Aug. 28, 1934

1,971,665

UNITED STATES PATENT OFFICE 1,971,665

CLUTCH PLATE

Elmer V. J. Tower, North Syracuse, N. Y., assignor, by mesne assignments, to Automotive Patents Corporation, New York, N. Y., a corporation of Delaware Application January 7, 1932, Serial No. 585,302

18 Claims. (Cl. 192—107)

This invention relates to clutches of the type used in motor cars and is concerned more particularly with a novel transmitting element or plate for use in clutches of the single or twin disc types.

Clutches now used in motor cars commonly include a transmitting element in the form of a disc or plate which is connected to the propeller shaft of the car and forced against a surface of the fly-wheel of the motor by a spring-actuated presser plate in order to establish a driving connection between the motor and the propeller shaft. Ordinarily the springs acting on the presser plate tend to keep the clutch in engagement and when the clutch is to be disengaged or thrown out, the operator depresses a pedal which acts on the presser plate through suitable levers and moves it back away from the transmitting element against the action of the springs. In engaging or letting in the clutch, the pedal is released so that the springs act on the presser plate and cause it to force the disc into contact with the fly-wheel surface. The transmitting element is provided with friction material which is in contact with the presser plate and the fly-wheel when the clutch is in operation.

If the operator of such a clutch releases the clutch pedal too quickly, the heavy clutch springs cause the presser plate to force the transmitting element suddenly into contact with the fly-wheel and the clutch seizes or grabs, with the result that a considerable strain is imposed on the motor, the clutch, and the propeller shaft and the car starts jerkily. Further strains are imposed on the clutch and propeller shaft by reason of torsional vibration generated by the motor and transmitted through the clutch disc to the shaft. Aside from strains thus imposed on the parts, torsional vibration developed by the motor makes the car operate noisily and with an unpleasant jerking action.

The present invention is directed to the provision of a novel transmitting element for use in such clutches which is so constructed as to prevent seizing and grabbing of the clutch even when the latter is not skillfully manipulated and also to absorb and dampen much of the vibration generated in the motor. By reason of certain novel features in the clutch disc construction, a clutch which includes it engages more gradually and smoothly than standard clutches regardless of the skill of the operator. The new transmitting element is simple, light, and strong in construction and is easily and inexpensively manufactured and assembled.

The transmitting element constructed in accordance with the principles of the invention comprises a disc of thin sheet metal mounted on a hub splined to the shaft which is to be driven, and this disc is formed with a plurality of openings defined by spokes, the axes of which are tangential rather than radial. The spokes are connected at their outer ends to form a rim subdivided into a plurality of arcuate sections disposed in advance of the spokes in a direction of rotation, with the forward end of each section connected to the one ahead of it by a flexible bridging strip. Mats or facings of friction material are mounted on the rim of the disc in the usual way and overlie the arcuate sections and bridging strips.

The disc is formed to provide the necessary strength with little weight and the rim includes spaced areas which are distorted out of the plane of the disc, so that in the clutching operation, the entire surfaces of the friction facings are not brought immediately into contact with the driven member under the action of the clutch springs, but engage gradually as the distortion is overcome by the force of the springs. Similarly, the disengagement of the facing from the driving member during declutching occurs gradually so that the clutch operates smoothly and has no tendency to seize, grab, or drag. Because of the odd number of spokes, the vibration set up in one spoke is redistributed and divided between a pair of spokes on the opposite side of the hub, since vibration tends to follow diametrical lines, while the tangential arrangement of the spokes also prevents direct diametrical transmission of vibration and lengthens the path of travel thereof and thus absorbs or lessens the vibration.

For a better understanding of the invention reference may be had to the accompanying drawings, in which Figure 1 is a face view of the new clutch plate of this invention;

Fig. 5 illustrates a modified form of the sheet metal spider in which the bridging strip between segments of the rim is distorted longitudinally;

Fig. 6 is a section therethrough as seen along the line 6—6 of Fig. 5;

Fig. 7 illustrates the bridging strip distorted transversely;

Fig. 8 is a transverse section therethrough as seen along the line 8—8 of Fig. 7;

Fig. 9 illustrates a different way of distorting the sheet metal bridging strip of Fig. 5;

Fig. 10 illustrates the use of a second bridging strip having two parts which are tilted at an angle to the plane of the disc; and Fig. 11 is a transverse section through the second bridging strip as seen along the line 11—11 of Fig. 10.

Figure 1:
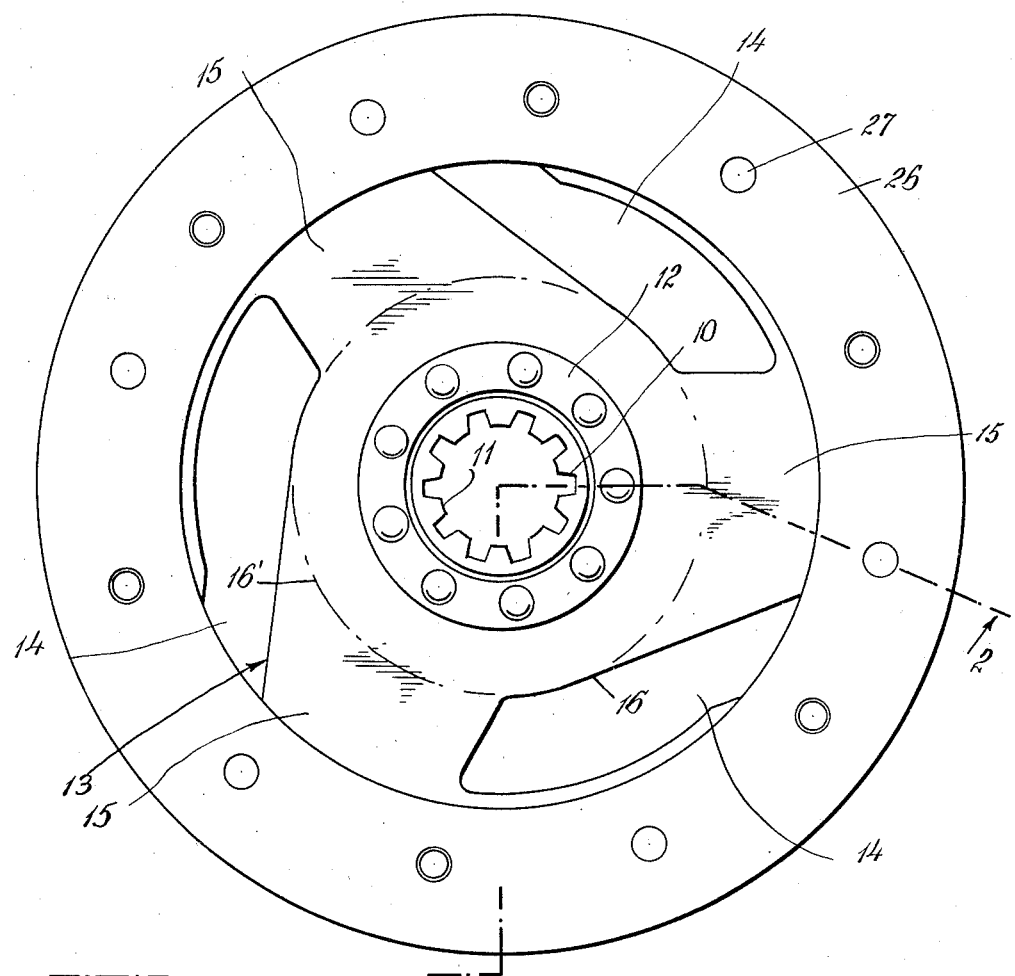
Figure 2:
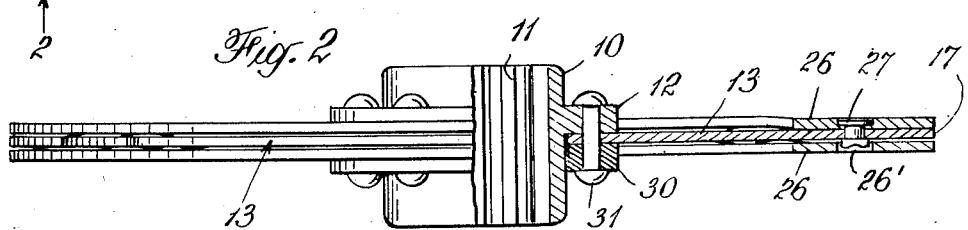
Fig. 2 is a partial section and edge view thereof as seen along the line 2—2 of Fig. 1.

Referring now to Figs. 1 and 2 of the drawings, the new clutch plate is shown as comprising a hub 10 provided on its inner surface with a plurality of splines 11 for effecting driving engagement with the transmission shaft. This hub has a circumferential flange 12.

Figure 3:
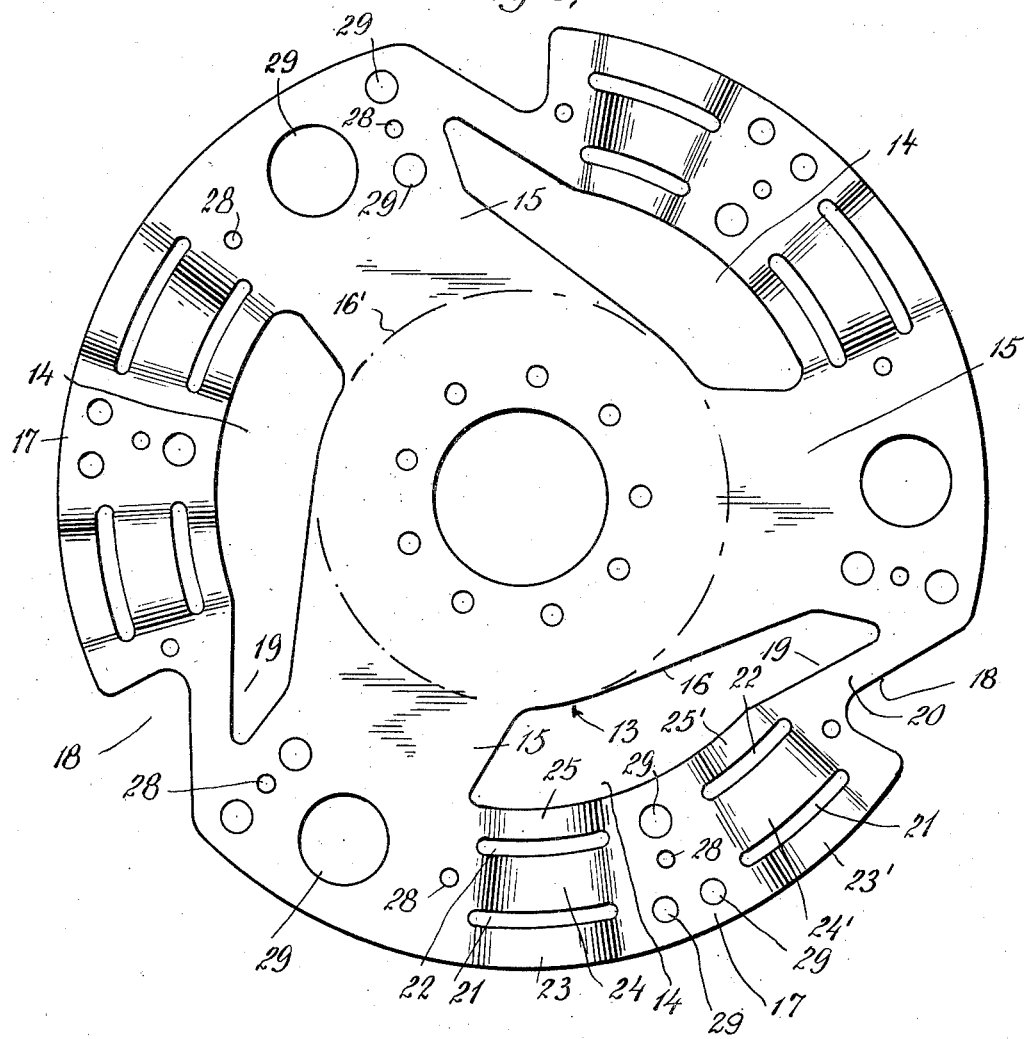
Fig. 3 is a face view of the sheet metal spider disc of the new clutch plate.

Mounted on the hub is a disc 13 formed of flat sheet metal provided with a plurality of openings 14 defining spokes 15. Preferably the disc is formed with an odd number of spokes, such as three, the spokes being spaced at equal radial angles. It has been found that vibration in a clutch plate tends to be set up along diametrical lines and when an odd number of spokes is employed, the vibration set up in one spoke is distributed between a pair of spokes on the opposite side of the hub and the vibration is thus lessened. In order further to distribute and dampen such vibration, the spokes are not radially formed but the trailing edge 16 of each spoke extends tangential to a circle 16' concentric with the hub 10, as shown in Figs. 1 and 3. Vibration set up in each spoke, therefore, is not transmitted along radial lines toward the hub but along tangential lines, whereby the path of travel of the vibration is lengthened and the vibration is lessened to a substantial degree, since the spokes 15 are not rigid but are flexible at an angle to the plane of rotation of the clutch plate.

The outer ends of the spokes are connected by a segmental or sectional rim 17 and the forward end of each section or segment of the rim is cut away on its opposite edges as indicated at 18 and 19, to provide a relatively narrow bridge strip 20 which extends at an angle to the inner and outer edges of the rib 17 and connects the forward end of each segment or section to the trailing edge of the next adjacent spoke. These narrow strips 20 of metal intersecting the arc of the rim 17 render the rim flexible and permit its distortion out of the main plane of the disc. At the same time, they prevent excessive distortion of the disc during processing when the friction material is applied.

The rim sections or segments are provided with circumferentially extending slots or openings 21 and 22 between the spokes. Preferably the openings 21 and 22 are arranged in pairs and each section of the rim contains two pairs of openings. These openings lessen the weight, increase the flexibility of the rim and assist heat dissipation, but they are so disposed and proportioned as not to impair the strength of the construction.

In order to make the clutch operate more smoothly and to prevent seizing or grabbing, portions of the rim of the disc are distorted out of the plane thereof and for this purpose, the arcuate strips 23, 24 and 25 of the rim defined by openings 21, 22 may be distorted out of the plane of the rim. For example, strips 23 and 25 may be formed to lie at one side of the plane of the rim, while strip 24 is formed to lie at the other side of that plane. When that arrangement is used, the next group of strips preferably receives the opposite distortion; that is, strips 23' and 25' will be formed to lie at the same side of the plane of the rim as strip 24 and strip 24' will be formed to lie at the same side of the plane of the rim as strips 23 and 25.

In some instances, it may not be necessary to distort all of the strips in any group as, for example, strip 24 may be distorted out of the plane of the rim to lie at one side thereof while strips 23 and 25 are not distorted. When that arrangement is employed, strip 24' will be distorted out of the plane of the rim to lie on the opposite side thereof from strip 24. If desired, strips 24 and 24' may lie in the plane of the rim without distortion, while strips 23 and 25 both lie at one side of the plane of the rim and strips 23' and 25' both lie at the other side of the plane of the rim.

Figure 4:
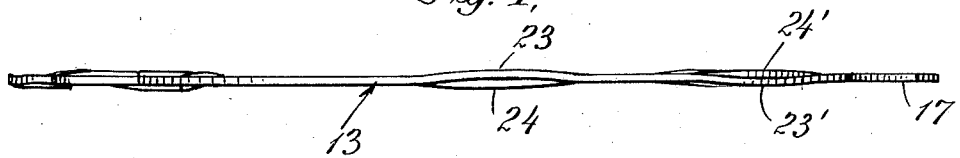
Fig. 4 is an edge view of the spider disc.

One form of distortion of the strips is indicated in Fig. 4 which illustrates the rim in edge view. In addition to the slots 21 and 22 which provide the distortable sections, the rim is preferably lightened by forming openings 29 through it and the rim will be lightened by openings 29 and other openings similar to slots 21 and 22 even though the strips defined by the slots are not distorted.

The friction facings 26 are applied to the opposite surfaces of the metal disc 13 by means of the countersunk rivets 27 passing through rivet holes 28 in the disc rim 17. These rivets 27 are so applied that every other rivet secures only one friction facing to the disc 13, while the remaining rivets 27 secure the other friction facing 26 to the opposite side of the disc 13. The facings are provided with holes 26' to accommodate the heads of the rivets 27 securing the other friction facing to the disc, as is shown in Fig. 2. The bulges on the metal disc 13 caused by the distortion of the strips 23, 24, 25, 23', 24' and 25' separate the friction facings 26 slightly, as indicated in Fig. 2.

The disc 13 is mounted on the hub 10 and one surface thereof lies in contact with one face of the hub flange 12. Also mounted on the hub 10 on the opposite side of the disc 13 is a collar 30 which is secured to the disc 13 and hub flange 12 by means of the rivets 31. The disc 13 is accordingly securely clamped between the hub flange 12 and the collar 30.

Instead of or in addition to the distortion of the rim sections or segments in the manner described, the bridging strips connecting the segments may be distorted in various ways, as is shown in Figs. 5 to 9, inclusive. In the arrangement shown in Figs. 5 and 6, the bridging strip 20' connecting the sections or segments 17' of the sheet metal spider 13' is distorted longitudinally by being undulated in the manner best shown in Fig. 6, which illustrates a longitudinal section through the bridging strip 20'. If the strips of the rim sections or segments defined by the slots 21' and 22' are not distorted in the manner previously described in connection with Figs. 1 to 4, the slots 21' and 22' serve to lighten the weight of the disc and aid in the dissipation of frictional heat.

This bridging strip 20' may also be distorted in various different ways. For example, Fig. 9 illustrates a longitudinal section through the strip 20' which is distorted so as to have a curve of different shape from that illustrated by Figs. 5 and 6. Instead of distorting the bridging strip longitudinally as illustrated in Figs. 5 and 6, it may be distorted transversely, as illustrated in Figs. 7 and 8. In this arrangement the bridging strip 20'' connecting the sections or segments 17'' of the sheet metal disc 13'' are undulated transversely in the manner best illustrated by the transverse section, Fig. 8. This bridging strip may also be distorted in various ways with different curvature.

A further method of providing distortion in the rim of the disc so as to make the clutch operate more smoothly is illustrated in Fig. 10. Here, each arcuate section between a spoke end and a bridging strip is cut away on opposite sides to reduce its width, the cutting operation forming a strip 37 somewhat similar to the ordinary bridging strip but of greater length and width. The strip 36 is inclined at an angle to a radius and is divided lengthwise by a slot 38 forming two sections 39. These sections may then be bent out of the plane of the disc in various ways. The sections may be bent in a manner similar to the strips 23, 24 and 25, they may be given an undulated form as illustrated in connection with the bridging strip 20 in Figs. 5 to 8 of the drawings, or each section may be bent on its longitudinal axis so as to force portions thereof out of the plane of the rim. The latter arrangement is illustrated in Fig. 11 wherein each of the strips 39 is indicated as bent about its longitudinal axis so that its lateral edges lie on opposite sides of the plane of the rim.

With all of the constructions described, it will be apparent that portions of the rim are bent out of the plane thereof and in the operation of a clutch which includes the new transmitting element, the action of the presser plate in forcing the element against the fly wheel under the action of the clutch springs causes initial contact of the friction mats on the transmitting element with the fly wheel and presser plate to be limited to those portions of the mat which overlie the outwardly distorted areas of the rim.

By reason of this limited contact, an initial slippage occurs between the transmitting element on one hand and the fly wheel and presser plate on the other, but, as the transmitting element picks up speed, the distorted areas thereof are gradually flattened out with the result that a full contact between the friction facings of the element and the driving surfaces of the fly wheel and presser plate takes place. When this full contact is obtained, the engaging pressure is evenly distributed throughout the entire surfaces of the facings on the element. The original distortion of the rim of the element thus automatically produces a preliminary slippage, which dampens vibrations and permits the clutch to engage gradually and smoothly even when carelessly manipulated.

The spoke construction with the numerous openings makes the clutch plate of light weight and of low inertia under spinning conditions in operation and the disc readily gives off heat, since air can flow through the disc in contact with the spokes. The cutting away of the rim to leave the connecting bridge portions 20, 20', 20'', 36 or 37, makes the rim highly flexible and thus insures that the disc will adapt itself to irregularities resulting from faulty manufacture or installation, or injury to the clutch or driving parts thereof. The tangential arrangement of the spokes redistributes and, to a certain extent, dampens the vibrations which are imparted to it and the combination of the spokes and the rim sections connected by the flexible bridging strips provides maximum strength while preserving lightness and simplicity in construction.

This application is a continuation in part of my co-pending application, Serial No. 434,256, filed March 8th, 1930.

I claim:

1. In a clutch plate, the combination of a hub, and a disc secured thereto and having openings defining spokes and a continuous rim integral with the spoke ends, said rim being subdivided into a plurality of sections connected by strips of substantially less width than the width of the rim elsewhere.

2. In a clutch plate, the combination of a hub, and a disc secured thereto and having openings defining spokes and a rim integral with the spoke ends, said rim comprising a plurality of curved sections connected by strips of less width than the sections, said strips extending at an angle to a tangent to the rim at the point where said strips are connected to sections.

3. In a clutch plate, the combination of a hub, and a disc secured thereto and having openings defining spokes and a rim integral with the spokes, said rim being made up of a plurality of sections and connecting strips between the sections, said strips connecting the inner edge of one section with the outer edge of the adjacent section.

4. In a clutch plate, the combination of a hub, and a disc secured thereto and having openings defining an odd number of spokes with a continuous rim connecting the ends of said spokes, each spoke having a trailing edge tangent to a circle concentric with the axis of the hub.

5. In a clutch plate, the combination of a hub and a disc secured thereto and having openings defining spokes, a rim integral with the ends of the spokes, each spoke having an edge tangent to a circle concentric with the axis of the hub, and the rim being made up of a plurality of sections, each section lying in advance of a spoke in the direction of normal rotation and having a narrow strip connecting its forward end to the next spoke in advance.

6. In a clutch plate, the combination of a hub, and a disc secured thereto and having openings defining spokes, and rim segments integral with the spokes, the adjacent rim segments being connected together, the connecting means being in the form of a narrow strip and having portions distorted out of the plane of the segments.

7. In a clutch plate, the combination of a hub, and a disc secured thereto and having openings defining spokes, and rim segments integral with the spokes, said rim segments being connected with narrow strips and having circumferential slots dividing them into narrow strips.

8. In a clutch plate, the combination of a hub, and a disc secured thereto and having openings defining spokes, and rim segments integral with the spokes, said rim segments being connected with narrow strips and being slotted and distorted out of the plane of the segments between the slots.

9. In a clutch plate, the combination of a hub, and a spoked spider secured thereto, the spokes of the spider each having one edge approximately radial and the other edge tangent to a circle concentric with the axis of the hub.

10. In a clutch plate, the combination of a hub, a disc secured thereto, a ring of friction material secured to the disc, and a spider forming a part of the disc connecting the hub and ring by means of the disc, said spider having an odd number of spokes spaced equi-distantly circumferentially.

11. In a clutch plate, the combination of a hub, and a disc secured thereto and having an odd number of openings defining an odd number of spokes and a rim having segments integral with the spoke ends.

12. In a clutch plate, the combination of a hub, and a disc secured thereto and having a rim reduced in width at spaced points to provide strips, said strips being distorted out of the plane of the disc.

13. In a clutch plate, the combination of a hub, and a disc secured thereto and having a rim reduced in width at spaced points to provide strips, certain of said strips being distored out of the plane of the disc and others of said strips being bent at an angle to the plane of the disc.

14. In a clutch plate, the combination of a hub, and a disc secured thereto and having a rim reduced in width at spaced points to provide strips, said strips being distorted transversely out of the plane of the disc.

15. In a clutch plate, the combination of a hub, and a disc secured thereto and having a rim reduced in width at spaced points to provide strips, said strips being distorted longitudinally out of the plane of the disc.

16. In a clutch plate, the combination of a hub, and a disc secured thereto and having a rim reduced in width at spaced points to provide strips, said strips being slotted longitudinally to form a plurality of elements, said elements being bent at an angle to the plane of the disc.

17. In a clutch plate, the combination of a hub, and a disc secured thereto and having slots and intermediate strips, the strips being integral with the disc at both ends and bent at an angle to the plane of the disc.

18. A clutch plate which comprises spokes, and a continuous rim integral with said spokes, said rim being formed of arcuate sections and connecting members, said connecting members having portions lying out of the plane of said rim.

ELMER V. J. TOWER.